Figure 3:
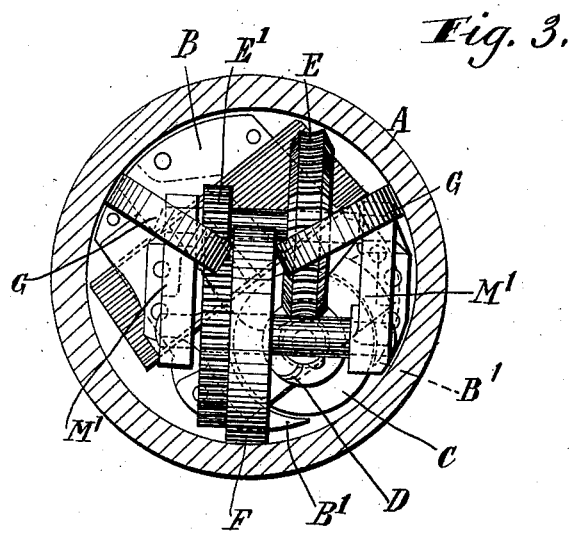

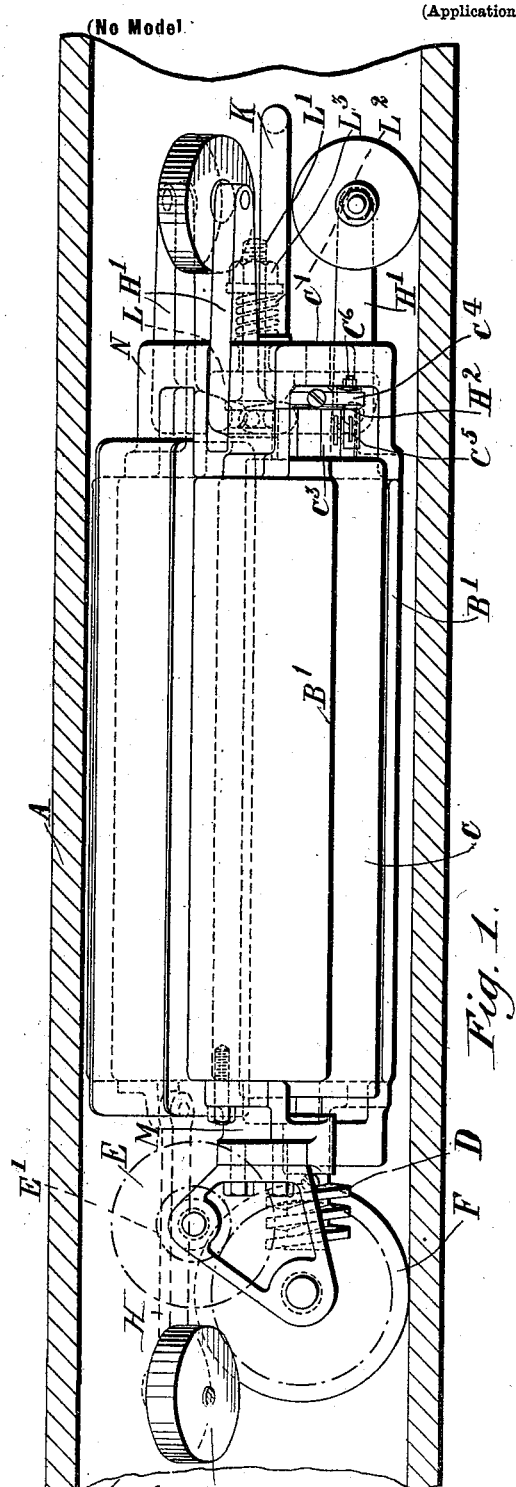

No. 621,018. Patented Mar. 14, 1899.
E. L. BENJAMIN.
LOCOMOTOR FOR USE IN PIPES OR CONDUITS.
(Application filed Sept. 13, 1898.)
(No Model.) 3 Sheets—Sheet 2.

Witnesses:
H. K. Boulter

Inventor:
Edgar L. Benjamin,
By Wm. E. Boulter,
Attorney.

No. 621,018. Patented Mar. 14, 1899.
E. L. BENJAMIN.
LOCOMOTOR FOR USE IN PIPES OR CONDUITS.
(Application filed Sept. 13, 1898.)
(No Model.) 3 Sheets—Sheet 3.
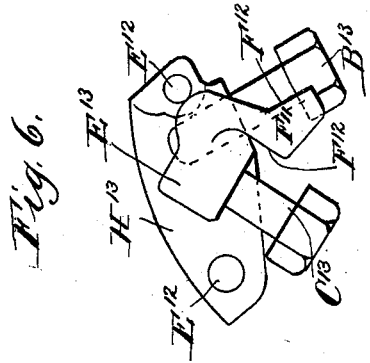
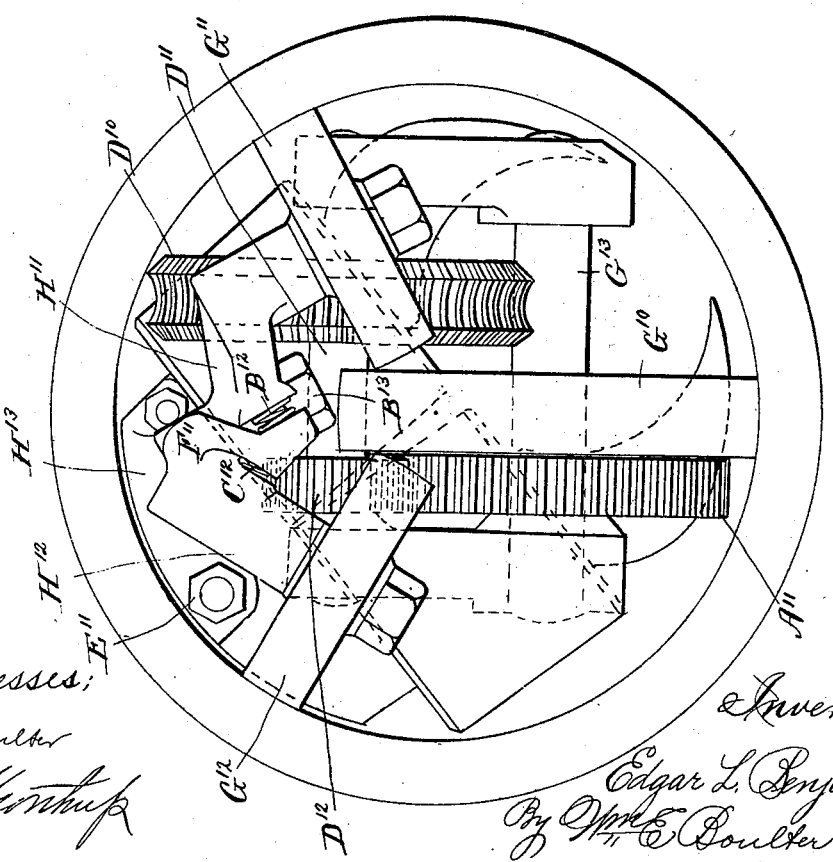

UNITED STATES PATENT OFFICE.

EDGAR LIONEL BENJAMIN, OF LONDON, ENGLAND.

LOCOMOTOR FOR USE IN PIPES OR CONDUITS.

SPECIFICATION forming part of Letters Patent No. 621,018, dated March 14, 1899.

Application filed September 13, 1898. Serial No. 690,881. (No model.)

*To all whom it may concern:*

Be it known that I, EDGAR LIONEL BENJAMIN, a subject of the Queen of England, residing at London, England, have invented a Locomotor for Use in Pipes or Conduits, of which the following is a full, clear, and exact description.

This invention has for its primary object the provision of a locomotor or hauling-trolley to be actuated by electric power or compressed air, gas, or steam for quickly drawing flexible cables or rods, and particularly conductors of electricity for power or for signaling into their pipes or other receptacles, such electric conductors being either insulated or bare and of any form, said conductors being employed for various purposes—as, for instance, either electric light and power distributing mains or feeders in any system of electric distribution or on electric tramways or railways.

The invention is equally well suited as a despatch-carrier in substitution for pneumatic-despatch systems and as a propeller for a brush cleaner or scraper for pipes or the like for sewage, water, gas, compressed-air, or other service.

The invention will be found to be adapted for many other purposes not herein referred to, and I reserve the right to the use of my invention for any purpose whatsoever.

-In using my invention a main switch and a starting-switch or, in substitution for both, a suitable "controller" are or is to be employed for governing the speed of drawing in the cable, together with a rheostat, when a direct current, or with a variable induction solenoid, when an alternating current, is the source of motive power, as also a trailing power-line, which may be in the form of a light insulating twin wire, and a source of electric energy, which in the case of already-laid neighboring cables is preferably derived from some machine or accumulators in the central or sub station, the laid cables being temporarily joined up in circuit for this purpose if not yet permanently connected. Should such facilities not obtain, portable accumulators or a battery of other cells or a small dynamo or magneto-electrical machine should be brought into requisition.

The power-line of the electrolocomotor may be wound upon a spool or reel either stationed on the pavement or elsewhere or carried by the machine itself. In either case the provision of suitable means for rapidly rewinding the paid-out line upon the spool after use by the agency of the electromotor of the invention is very desirable. These remarks apply equally to the trailing line when such is employed with the electrolocomotor. The cables to be drawn in may themselves form the power-line to the electrolocomotor. Thus during the laying of a main this may fulfil the function of the "lead," while the "return" is provided by an auxiliary light trailing wire, insulated or bare, or by the conduit itself.

In dealing with concentric or sheathed or armored cable or two conductors simultaneously the power-circuit is self-provided. It is immaterial to this invention if the containing-conduit form, normally, a common return or an intentional "earth" to the electric system of mains or if, on the other hand, it perform no electrical function.

In combination with the electrolocomotor a strong hook, eye, or other device is employed for the attachment of the line for drawing in the cables or for the direct attachment of the cable. The trailing tractive line may be a rope, of metal or of hemp, to the rear end of which the electric main is to be secured, or so as to employ a motor of yet smaller power where it is desired to do all the actual hauling by hand or by winch only a cord or wire need be threaded through the conduit by the direct agency of the machine.

To further elucidate the intended methods of applying this invention the accompanying drawings illustrate one specific design of locomotor to be actuated by electricity and intended for use in a pipe or conduit.

Figure 4:
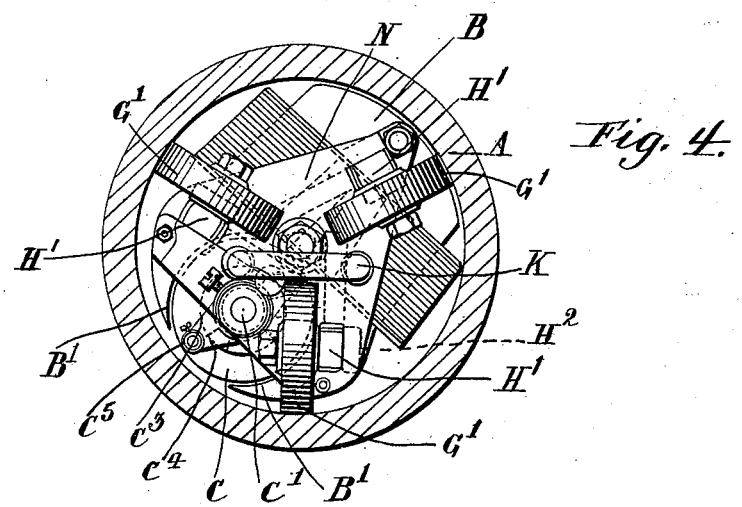

Figure 1 is an elevation of a form of device in position in the pipe, the latter being in section. Fig. 2 is a plan of the same, the trailing portions being omitted. Fig. 3 is a front view, and Fig. 4 is a rear elevation, of the device. Fig. 5 is a front view showing a modified construction. Fig. 6 is a detail view.

Like letters indicate like parts throughout the drawings.

In the drawings, A represents a pipe or conduit, and B the field-magnet of the electromotor.

C is the armature, revolving between the pole-pieces B′ of the magnet. The armature-spindle C′ of the armature is prolonged and carries either upon it or upon an extension attached thereto a worm D. This worm D operates the driving-wheel F of the device through worm and toothed gearing E E′. In addition to this driving-wheel F are two rollers G, lying in radial planes and carried on arms H, which tend to keep the device central within the pipe. At the trailing end of the device are three such rollers all lettered G′ and serving the same purpose as the rollers G. The device is provided at its controlling end with a large hook or other attachment device K, to which the object which the locomotor is intended to take through the pipe may be attached. The controlling-rollers G′ are carried on arms H′, each of which rollers normally lies in a radial plane and said arms H′ being pivotally supported at $H^2$ on the frame of the machine. The arms H′ are in the shape of bell-cranks, and their short ends engage with a grooved sleeve L. The sleeve L slides on a pin L′, which also carries a spring $L^2$ and nut $L^3$. The armature-spindle C′ has its bearings in a front bracket-plate M and rear bracket-plate N. The front bracket-plate M also serves to support two side plates M′, in which the gear-wheels are journaled. Between the rear plate N and the magnet of the machine is located the commutator $C^3$ and brush-rocker and brushes, (lettered $C^4$ and $C^5$, respectively.) The conducting-cables by which power is supplied to the motor may conveniently be secured thereto by the metal nuts $C^6$, which are in connection with the brushes.

Owing to the very restricted space within which the device has to work it is found necessary for high-power motors to employ a special construction of armature-spider in order to allow sufficient room for the armature-conductors. This construction comprises, say, three webs fitted in grooves on the shaft and not mounted, as is usual, upon a sleeve upon the same. These webs serve to support the armature-core disks. From the consideration of these details it will be observed that the magnet B forms the foundation of the whole device and serves to carry all the adjuncts. The rotation of the armature between the pole-pieces B′ transmits motion through the worm and gear wheels to the driving-wheel or "tractor" F, which thus receives a rotation in a plane substantially at right angles to that of the rotation of the armature. This rotation serves to propel the device through the conduit by the frictional engagement of the circumferential periphery of the wheel F with the wall of the pipe or conduit. This portion of the apparatus is preferably placed at the forward end, as shown, although the parts shown at the forward and trailing end may obviously to a certain extent change places. For instance, the commutator might, if desired, be placed at the forward end and the tractor at the controlling end; but it is preferred to arrange matters in the manner shown in the drawings.

The device may very conveniently be employed in conjunction with a skeleton pipe formed of, say, three rods so disposed that one of the wheels carried at the fore and rear end of the machine engages with each rod. This application may prove of service in connection with well-known "cash-railways" at present employed in large commercial establishments.

The commutator where the motor is for continuous currents, or the collecting-rings when for alternating, are preferably arranged at the opposite extremity of the armature to that occupied by the worm; also, in preference the tractor, with its gearing, is placed in the vanguard and the current-collecting device in the rear of the machine.

If desired, one or more of the rollers of either or both sets may be at liberty to swerve or change its plane (normally radial) slightly, so as more readily to accommodate the available space between any given pair of rollers of a set in the event of there being bad kinks in that part of the laid cables which the machine is for the moment traversing.

If desired, the rear set of roller-arms may be separated from and readily attachable to the electrolocomotor for different conduits of greatly-varying diameters.

Although I preferably use three arms to each set, yet their number is not necessarily confined to three, but may be more or fewer, at discretion.

In the employment of the device in services of greatly-varying conditions as regards bores or material or nature of supply through the pipe, &c., various appurtenances to this apparatus may be necessary or advisable, and I reserve the right to the use of the same.

Any suitable device for launching the electromotor into a conduit may be employed, as also for removing the same from the conduit, the insertions and removals generally occurring at the manholes constructed over street-boxes, feeding-point junctions, or service-boxes, &c.

In Figs. 5 and 6 I show a slightly-modified construction, and in these views $G^{10}$, $G^{11}$, and $G^{12}$ indicate the three centering-wheels for the device, $G^{10}$ being the tractor-wheel. The latter is driven from the worm-wheel $D^{10}$, on whose spindle $D^{11}$ is a pinion $D^{12}$, gearing with a spur-wheel $A^{11}$ on the tractor-spindle $G^{13}$. The other two rollers $G^{11}$ $G^{12}$ are carried by bent arms $H^{11}$ and $H^{12}$, respectively pivoted to a plate $H^{13}$, secured by bolts or studs $E^{11}$ to the magnet-yoke. This plate is shown more clearly in detail in the separate small view, the plate being shown at $H^{13}$ and holes for the bolts at $E^{12}$. Cast on the plate and integral with it is a projection $F^{11}$, rising from a foot $E^{13}$ on the plate $E^{11}$ and having two flat surfaces $F^{12}$, which are inclined toward each other at an angle of sixty degrees and which afford a bearing for the springs $B^{12}$ and $C^{12}$, which are in compression between these faces and corresponding cups on the arms $H^{11}$ and $H^{12}$. The spindles which carry the projecting arms $H^{11}$ and $H^{12}$ and about the centers of which they are free to swing are shown at $B^{13}$ and $C^{13}$. The faces $F^{12}$ are preferably cupped to receive the springs, and the projection $F^{11}$ is preferably of such a length that the springs $B^{12}$ and $C^{12}$ bear on the respective arms $H^{11}$ and $H^{12}$ at points about half-way along the length of the arms.

What I claim, and desire to secure by Letters Patent, is—

1. In a device for use as described, the combination with a support, of a tractor-wheel adapted to make contact with the inner wall of a conduit, spring-pressed arms pivotally connected with the support and adapted to make contact with the conduit and rollers carried by said arms, said rollers and tractor-wheel being arranged at such angular distances relatively to each other that the tractor-wheel is pressed into frictional engagement with the conduit.

2. In a device for use as described, the combination with a support, of a tractor-wheel adapted to make contact with the inner wall of a conduit, a rotatable shaft, gearing between the latter and the tractor-wheel whereby the latter is positively rotated, spring-pressed arms pivotally connected with the support and rollers carried by said arms and adapted to make contact with the conduit, said rollers and tractor-wheel being arranged at such angular distances relatively to each other that the tractor-wheel is pressed into frictional engagement with the conduit.

3. In a device for use as described, the combination with a support, of a tractor-wheel adapted to make contact with the inner wall of a conduit, a spindle or shaft rotatably carried by the support, an armature on said spindle, a field-magnet, arms pivotally connected with the support, rollers upon said arms, and gearing between the armature-spindle and the tractor-wheel whereby the latter may be positively rotated.

4. In a device for use as described, the combination with a support, of a tractor-wheel adapted to make contact with the inner wall of a conduit, arms pivotally connected with the support at one end, rollers carried by the other end of said arms, spring-pressed arms pivotally connected at the other end of the support, and rollers carried by the latter arms, a rotatable spindle, an armature thereon, a field-magnet, and gearing between the said spindle and the tractor-wheel whereby the latter may be positively rotated.

In witness whereof I have hereto set my hand in the presence of the two subscribing witnesses.

EDGAR LIONEL BENJAMIN.

Witnesses:
W. M. HARRIS,
FRED C. HARRIS.